United States Patent [19]
Braun

[11] Patent Number: 5,734,173
[45] Date of Patent: Mar. 31, 1998

[54] METHOD AND DEVICE FOR POSITIONING OF MOVING MACHINERY PARTS

[76] Inventor: Paul-Wilhelm Braun, Lindlau Strasse 23, Troisdorf, Germany

[21] Appl. No.: 653,630

[22] Filed: May 24, 1996

[51] Int. Cl.$^6$ .................................................. G01N 21/86
[52] U.S. Cl. .................... 250/559.29; 250/559.32; 356/375
[58] Field of Search .............. 250/231.13, 231.14, 250/231.16, 231.18, 559.27, 559.29, 559.32; 356/375, 142

[56] References Cited

U.S. PATENT DOCUMENTS

| | | | |
|---|---|---|---|
| 4,276,480 | 6/1981 | Watson | 250/559.27 |
| 5,070,238 | 12/1991 | Ishihara et al. | 250/231.13 |

FOREIGN PATENT DOCUMENTS 2730715  8/1991  Germany.

*Primary Examiner*—Que Le
*Attorney, Agent, or Firm*—Baker & Botts, L.L.P.

[57] ABSTRACT

A method and device for positioning moving machine parts by using two sensors to detect the spacing of code markers on a code bearing part attached to the machine part and counting the number of code markers detected while accounting for uneven spacing between code markers which invariably occur when two code bearing parts are joined for use on a single machine part.

2 Claims, 3 Drawing Sheets

5,734,173

METHOD AND DEVICE FOR POSITIONING OF MOVING MACHINERY PARTS

BACKGROUND OF THE INVENTION

The invention relates to a method and device for positioning of moving machinery parts, an optical signal being received from an emitter 20 by way of a timing rule 22 provided with line code markings 21 by a sensor and the sensor passing on an electrical time signal matching the line code marking to a counter.

A device of the kind mentioned is disclosed in U.S. Pat. No. 5,508,088 (PWB). The timing rule here consists of a transparent material on which the codings are arranged for scanning by optical sensors.

It is possible that the transparent material, on the side away from the transmitter, may be provided with a reflecting layer, in which case the light rays emitted from the transmitter are reflected along the optical axis and registered by the receiver, which emits a pulse to a control circuit to control the advance of a moving machinery part.

The length and frequency of the pulses is determined by so-called 'window openings,' produced by the coding into 'transmissive/opaque' preassigned areas on the timing rule. The beam of light issuing from the transmitter is thereby converted by a receiver located on the optical axis of the beam into a pulse, the kind of pulse depending on the nature of the window opening.

Conventionally, timing rules of finite length are employed to control a print head, a robot arm or a tool carriage. Increasingly, however, important applications are arising in which greater lengths are required for the motion of the carriage. Therefore the problem of constructing timing rules of considerable length presents itself.

The codings for timing rules, owing to the high precision required for the positioning of moving machinery parts, must be produced in one piece using costly machines. Costs of production thus rise exponentially, since the maintenace of close manufacturing tolerances becomes more and more expensive with increasing length.

In principle, it is possible to assemble several timing rules of shorter length to make a new timing rule of correspondingly greater length. The resulting butt joints, however, may corrupt the light signal and lead to errors in the determination of position. Another problem consists in that there will be an offset in the coding at the joints, inevitably leading to errors of measurement and hence to a faulty determination of position.

SUMMARY OF THE INVENTION

The object of the present invention, then, is to improve a method and device of the kind initially mentioned, in such manner that the determination of position will be possible even over considerable lengths using several assembled timing rules. The precision of the detection of position is to match the precision to be maintained in the use of an integral timing rule scale.

This object is accomplished by the features specified in claim 1. It has been found that by the use of two sensors and additional comparator units, the source of error in transgressing the boundary area of the timing rule can be minimized.

BRIEF DESCRIPTION OF THE DRAWINGS

In the following, the invention will be illustrated in more detail with reference to several embodiments by way of example. In the drawing.

DETAILED DESCRIPTION

Figure 1:
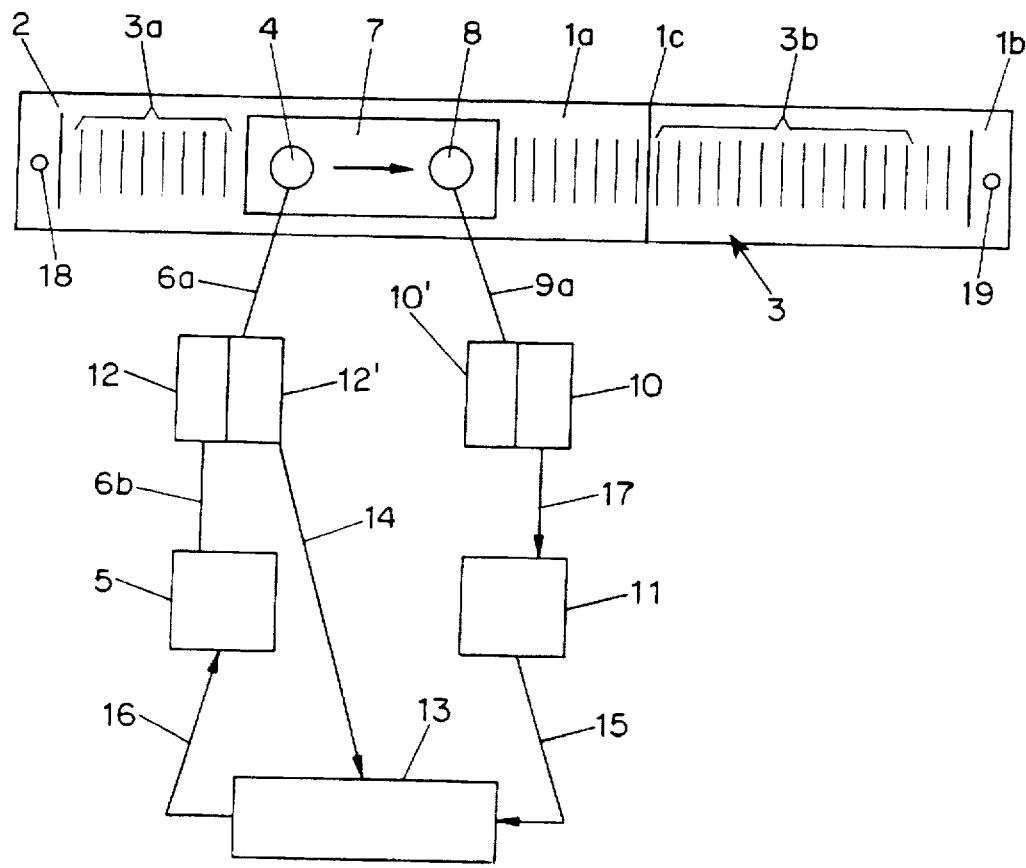
FIGS. 1, 1a, 1b show a device according to the invention with a moving sensor carriage.

In FIG. 1, the device for detecting positions of moving machinery parts is represented in the form of a multipartite timing rule capable of being fastened to a printer housing by fastening means 18, 19. The timing rule consists of two code-bearing parts 1a, 1b with an initial position 2, each part bearing equally spaced code marks 3a, 3b. The timing rules are joined at the point 1c where they meet.

On a sensor carriage 7, two sensors 4, 8 are arranged. The sensor carriage may be for example fastened to a printer head, together with which it travels over the timing rule. The sensors 4, 8 receive optical signals from a transmitter located behind the sensor carriage 7 in the picture plane of FIG. 1 and hence not visible.

Upon motion of the sensor carriage 7 in the direction of the arrow, both sensors 4, 8 receive signals matching the code markings traversed by the carriage. The sensor 4 is connected by lines 6a, 6b to a counter 5, detecting the code marks 3a traversed from the start position 2 on and storing them.

As soon as the sensor 8 reaches the join 1c, a comparator 10 connected to the line 9a behind the sensor 8 observes a change in the spacing of the marks. This change may for example be acquired by comparison of a test signal with the code signal received. For this purpose, a testing means 10' is integrated with the comparator 10.

Now if the test means 10' ascertains that a changed code signal has been received by way of line 9a, the counter 5 is disconnected from the line 6b and another counter 11 is connected to the sensor 8 by way of line 17. This means that upon motion of the sensor carriage 7 across the point of contact of the two code-carrying parts 1a, 1b, the signal is no longer stored in counter 5, but in counter 11.

Between the sensor 4 and the counter 5, another comparator 12 is arranged, the comparator 12, containing a test means 12'. If the test means 12' ascertains that a changed code signal has been received by way of the line 6a, these code signals are then passed on, in the event of a non-coincidence with a test signal, to a transfer unit 13, by way of line 14. The transfer unit 13 then emits the signals received by way of a line 15 which are then totaled, with the counter 5 by way of line 16, the counter 5 being thus reconnected to the line 6a, 6b for reception of new signals from the sensor 4.

At the same time, upon transition from one timing rule to the other, by comparison of the measured code signal with the test signal a continuous timing sequence is obtained, as though there were only one timing rule, with no interruption. This may be explained in more detail with reference to FIG. 3a, 3b.

Figure 3A:
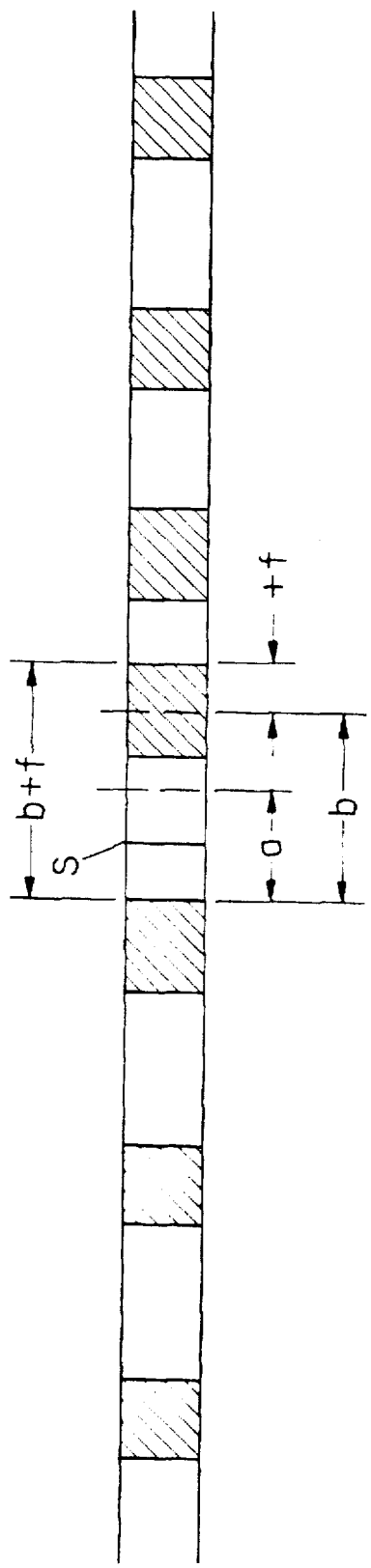
FIG. 3a, 3b shows error determination with a straight timing rule.

In FIG. 3a, the point of section S is so located that an error +f results. Here the code mark spacing b has been augmented by an amount +f, so that after traversing the point S, the value for the code counter must be increased by +f in order to compensate the error at the join.

Figure 3B:
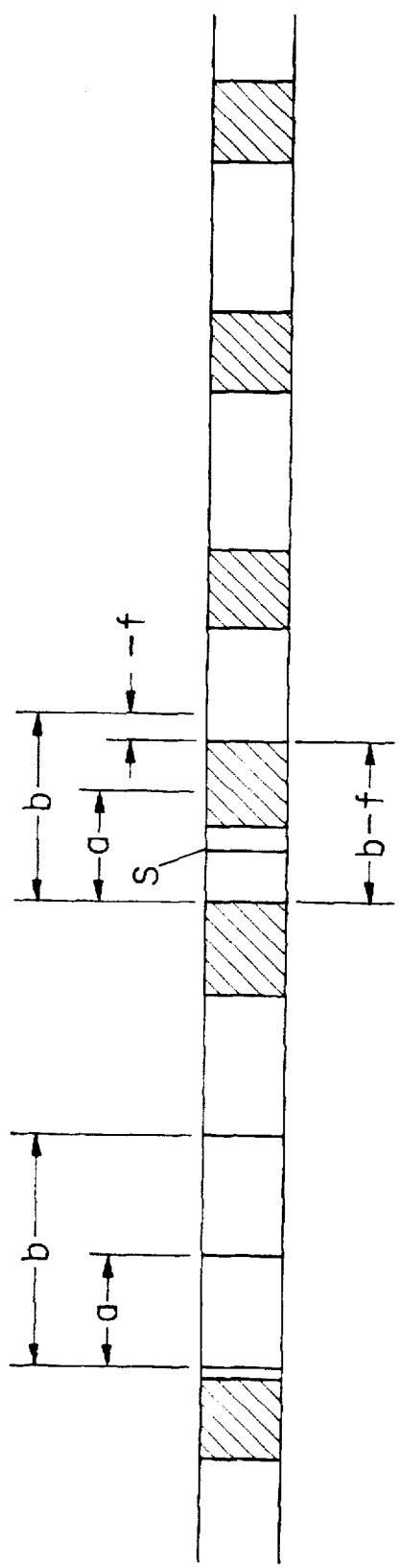

In FIG. 3b, the point of section S is located that an error −f results. Consequently, the code mark spacing b must be curtailed by the amount f to compensate the error at the join.

By the respective addition or subtraction of the error f, the value in the respective counter is properly corrected at the transition from timing rule 1 to timing rule 2.

Upon continued motion of the sensor carriage 7 beyond the point of section 1c, the sensor 4 also receives a changed code signal, not coinciding with the test signal in an associated comparator 12 with test means 12'. At this instant, the counter 11 is stopped and the signals so far totaled by it are passed on by way of a transfer unit 13 to the counter 5, now replaced in operation. So after traversing the point of section 1c, the counter 5 occupies the exact position of the moving part, for example a printer head. The count can then be continued until a new timing rule with new coding is detected by the sensor 8.

In like manner, motions of a cylindrical machinery part, as for example a shaft, a hollow cylinder or a drive gear, may be detected. For this purpose, curved timing rules may be fastened to the periphery of the cylindrical part and monitored by sensor units suitably arranged radially for positioning. If the circumference of the cylindrical part is considerable, several timing rules may be arranged in series, the sensors successively arranged in the direction of travel being circuited as described in the previous example.

The precision of the device according to the invention may be further improved in that, upon starting and slowing of the sensor carriage 7, a correspondingly changed test signal is made available for the starting and slowing operation. This avoids interpretation of the code signals received in the accelerated state, owing to their changed structure, as indicating a change of code-carrying part.

A refinement of the sensor-emitter unit consists in that the emitter 31 is arranged between the sensors 32 and 33 on the transport carriage 34. The code-carrying parts are then provided with a reflecting layer, so that the signals emitted by the emitter 31 are reflected and received by the sensors 32, 33 at an angle.

Figure 1A:
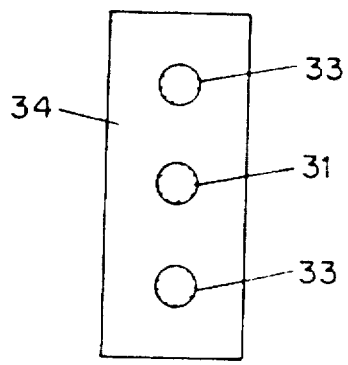
Figure 1B:
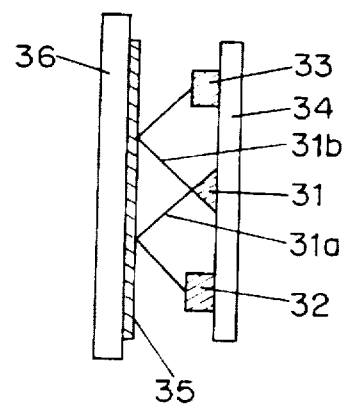

FIG. 1b represents the situation in cross-section of a timing rule and a sensor carriage. The light rays 31a, 31b emitted by the sensor 31 are reflected on the surface, provided with line markings 35, of the timing rule 36 and received by the sensors 32, 33. Of course, an arrangement of several sensors is also possible, as illustrated in the top view of a sensor carriage 34 in FIG. 1a.

Figure 2:
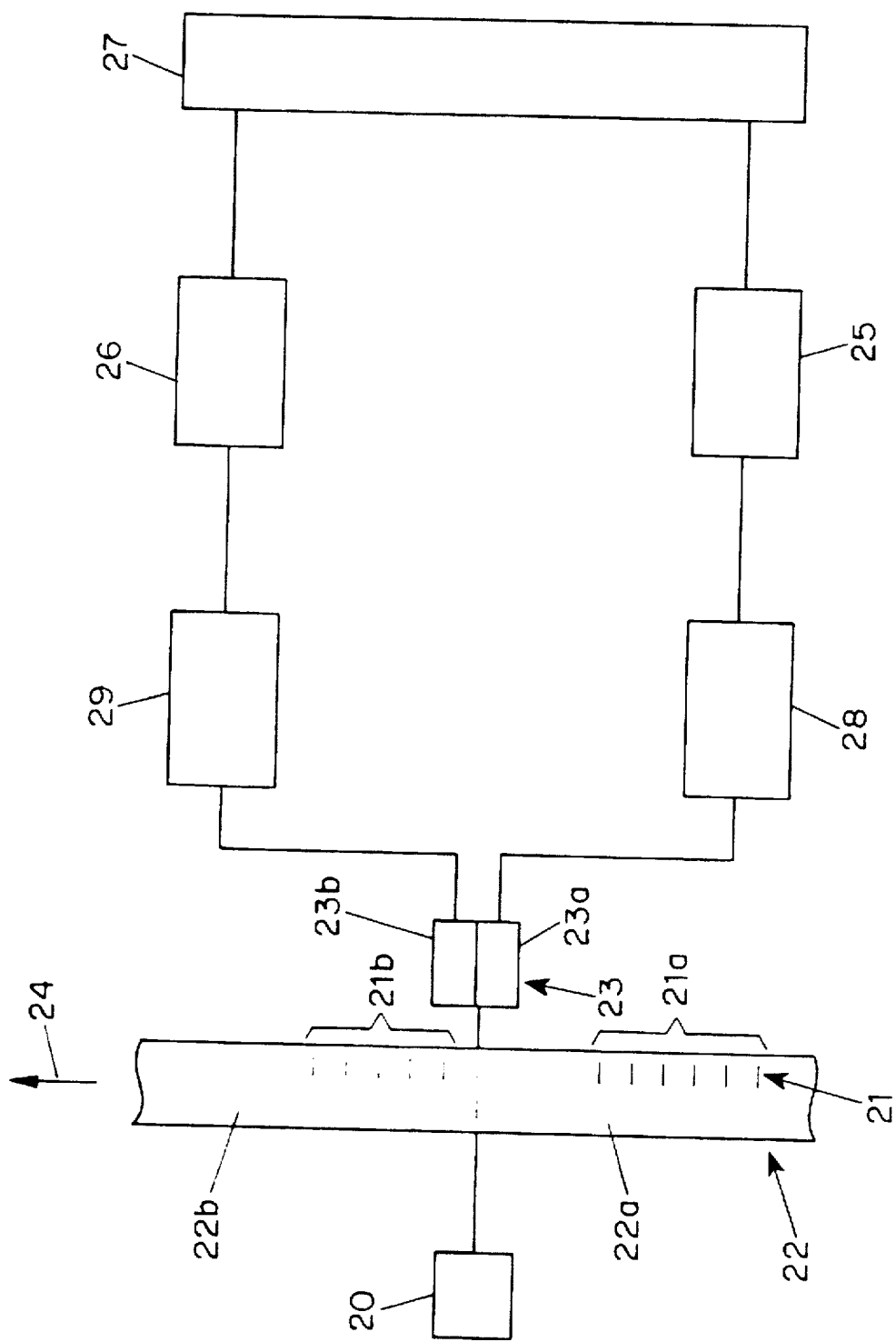
FIG. 2 shows a device according to the invention with a moving timing rule.

FIG. 2 shows, a moving timing rule 22 with various line codes 21. An optical signal emitted by the emitter 20 is received by a sensor 23, which passes on an electrical timing signal corresponding to the line code marking to a counter.

The timing rule 22 consists of two timing rule segments 22a, 22b provided with offset line code markings 21a, 21b.

Much as in the previous example, the sensor unit consists of two individual sensors 23a, 23b arranged one following the other in the direction of motion of the timing rule.

The sensor 23b located foremost in the direction of motion, upon encountering a new timing timing rule segment 21b, switches off a counter 25 of the first sensor 23a, and then counts the line code markings 21b of the new timing rule segment 22b. The segments counted are stored in a transfer unit 27.

As soon as the first sensor 23a also reaches the new timing rule segment 21b, the counter 26 of the second sensor 23b is stopped. Now the first counter 25 begins to count onward, the signals passed on by the second counter 26 to the transfer unit being added up with the contents of the first counter 25.

To improve the flow of signals, in addition to the counters 25, 26, comparators 28, 29 are connected to the individual sensors 23a, 23b. These comparators can ascertain changes in the line code markings by comparison with test signals, and so trigger the corresponding switching operations of the counters 25, 26 and transfer unit 27.

The switch, procedure described operates not in one direction only, but in either direction of motion. The only requirement is that the switch time for the sensors is sufficient so that no coding will travel past the sensor without being detected.

For fast-moving machine parts with high accelerations, it is necessary to arrange the sensors at a distance of several line codings. Experience indicates that the sensors should be spaced at least three line codes apart in order for the position-detecting routine to function reliably.

I claim:

1. A device for detecting the position of a moving machine part, comprising:

a) at least two code-bearing parts configured as timing rules fixed to a moving machine part, each part having equally spaced code marks of determinate spacing, scannable by a sensor;

b) a sensor carriage having first and second sensors longitudinally mounted thereon, positioned to scan the timing rules from the first end of the timing rules to the second end of the timing rules as the machine part moves, thereby generating a first code marker signal from the first sensor and a second code marker signal from the second sensor, in response to the detection of the timing rules;

c) a first comparator connected to the first of the two sensors to receive the first code marker signal from the first sensor;

d) a first counter means, in an initial state connected to the first comparator, thereby counting the number of code markers detected within the first code signal, storing the number of code markers detected, and providing the total number of code markers detected upon completion of a scan; the first counter means, in an alternative state, disconnected from the first comparator and storing the number of code signals received by the first sensor;

e) a second comparator connected to the second of the two sensors to receive the second code marker signal from the second sensor;

f) a second counter means, in the initial state disconnected from the second comparator and storing the number of code signals received by the second sensor; the second counter means, in the alternative state, connected to the second comparator, thereby counting the number of code markers detected within the second code signal and storing the number of code markers detected;

g) totaling means, connected to the first and second counters, for totaling the number of code markers detected and stored in the first counter with the number of code markers detected and stored in the second counter and resetting the number of code signals stored in the second counter when triggered;

h) a transferring means connected to the totaling means and the first counter for transferring the total number of code markers detected from the totaling means to the first counter when triggered, providing the device with the total number of code markers detected;

i) a first test means in the second comparator for detecting a change in the frequency of the second code signal; means responsive to the detection of said change in frequency of the second code signal, connecting the second comparator to the second counter and disconnecting the first counter from the first sensor, thereby switching the device from an initial state to an alternative state; and j) a second test means in the first comparator for detecting a change in the frequency of the first code signal; means responsive to the detection of said change in frequency of the first code signal, triggering the transferring means and reconnecting the first comparator to the first counter and disconnecting the second comparator from the second counter, thereby switching the device from an alternative state back to the initial state.

2. A method for detecting the position of moving machine parts, comprising:

a) scanning at least two code-bearing parts configured as timing rules fixed to a machine part, each code bearing part having equally spaced code marks of determinate spacing, by means of two sensors longitudinally mounted on a sensor carriage, the sensor carriage in an initial state, positioned to scan the timing rules at a first end of the timing rules to a second end of the timing rules as the machine part moves;

b) transmitting, simultaneous to (a), a first code marker signal, from the first of the two sensors connectively switched to a first comparator;

c) transmitting, simultaneous to (b), a second code marker signal, from the second of the two sensors connectively switched to a second comparator;

d) detecting a change in the frequency of the first code marker signal, and upon detecting the change, triggering a transfer unit and reconnecting the first comparator to a first counter and disconnecting a second comparator from a second counter, thereby reverting the device from an alternate state back to an initial state;

e) detecting, simultaneously to (d), a change in the frequency of the second code signal, and upon detecting the change, connecting the second comparator to a second counter and disconnecting the first counter from the first sensor, thereby switching the device from the initial state to the althernate state;

f) counting, after the initial state and after the occurrence of (d), the number of code markers within the first code signal and storing the number by means of the first counter;

g) counting the number of code markers within the second code signal and storing the number by means of a second counter;

h) totaling, upon the occurrence of (d), the number stored in the first counter with the number stored of the second counter, when triggered by the first comparator, by means of a transfer unit, and transferring the total to the first counter; and i) repeating these above steps until the sensor carrier reaches the end and thereby provides the distance that the machine part travelled, knowing the predeterminate spacing of the code markers and the number of code markers.

* * * * *